March 8, 1927.  
J. COLEY  
COMBINATION LAWN CLEANER  
Filed May 10, 1926  
1,619,851  
5 Sheets-Sheet 1

INVENTOR.  
Joseph Coley  
BY Myron J. Dikeman  
ATTORNEY.

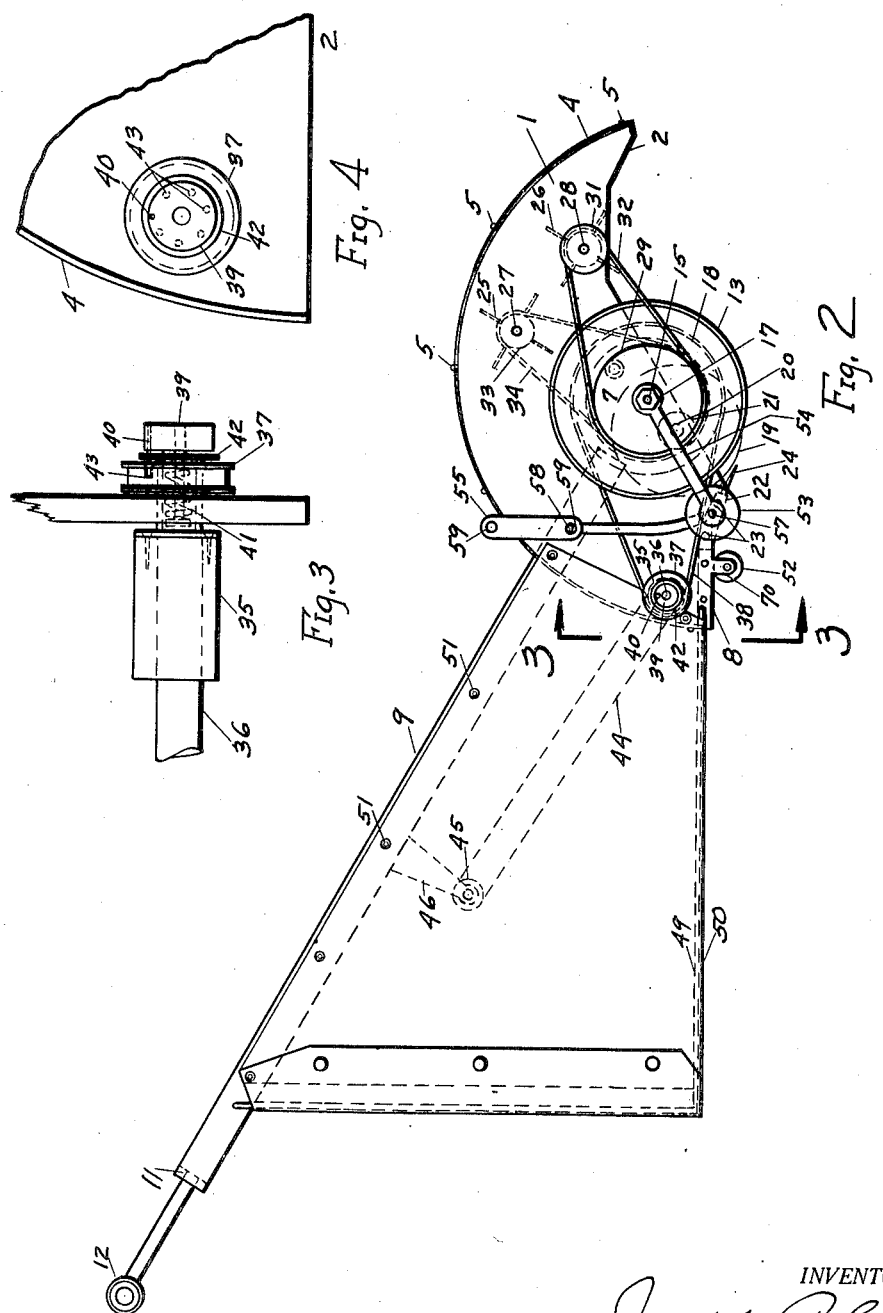

March 8, 1927.
J. COLEY
1,619,851
COMBINATION LAWN CLEANER
Filed May 10, 1926     5 Sheets-Sheet 3
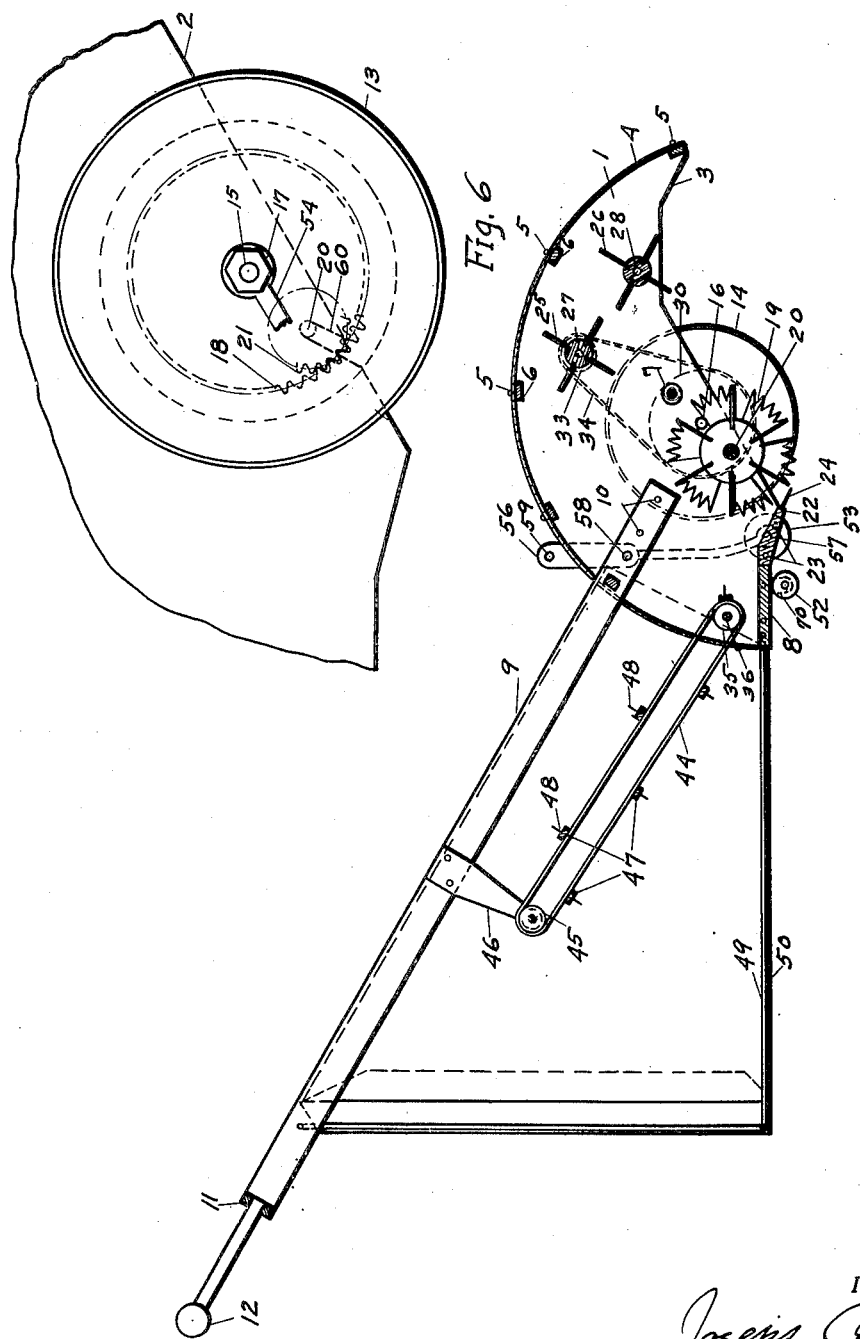
INVENTOR.
Joseph Coley
BY Myron J. Dikeman
ATTORNEY.

March 8, 1927.

J. COLEY 1,619,851

COMBINATION LAWN CLEANER

Filed May 10, 1926     5 Sheets-Sheet 4

INVENTOR.
Joseph Coley
BY Myron J. Dikeman
ATTORNEY.

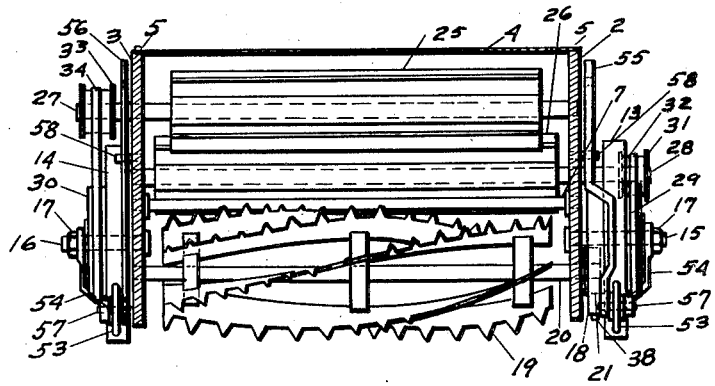
Fig. 8
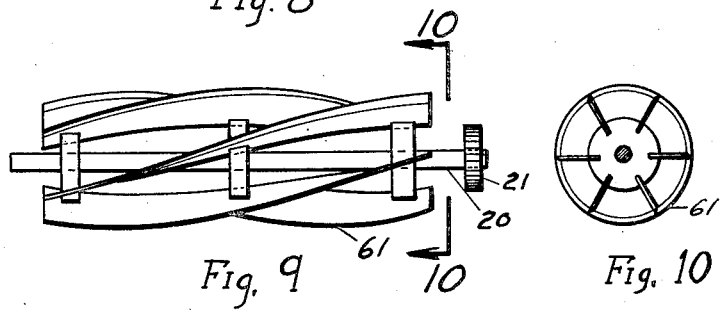
Fig. 9   Fig. 10
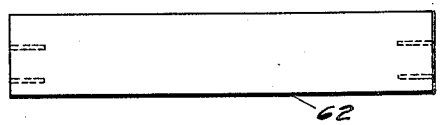 
Fig. 11   Fig. 12
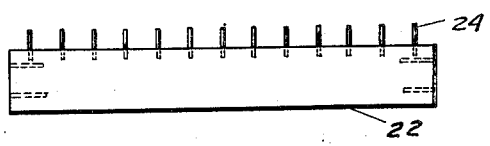 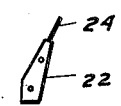
Fig. 13   Fig. 14

Patented Mar. 8, 1927.

1,619,851

UNITED STATES PATENT OFFICE.

JOSEPH COLEY, OF DETROIT, MICHIGAN.

COMBINATION LAWN CLEANER.

Application filed May 10, 1926. Serial No. 108,005.

The object of my invention is to provide a cleaning device that will cut, rake and clean the lawn grass by propelling the machine over the surface.

Another object is to produce a lawn cleaning machine, so constructed that it will operate as a lawn rake, for loosening and lifting the leaves as may have settled into the grass, also provided with a rotating rake section for removing the leaves into a retainer attached to the rear section of the cleaner frame.

A further object is to produce a combination lawn cleaning machine, comprising interchangeable members, making the device convertible into either a cutting or sweeping apparatus, by the interchanging of the rotary rake section for the rotary knife section.

A still further object is to produce a combination lawn cleaning device that is simple in construction, easily and efficiently operated and can be manufactured at a low cost.

These several objects are attained in the preferred form by the construction and arrangement of parts more fully hereinafter set forth.

Similar parts on all drawings are marked by similar numerals.

Fig. 2 is a side view of the device showing the propelling mechanism.

Fig. 3 is a sectional view taken on the line 3—3 of the Fig. 2, showing the clutch mechanism for attaching and operating the conveyor roll.

Fig. 4 is the end view of the clutch shown in the Fig. 3, showing its relative position to the attached pulley, and means for disconnecting the same.

Fig. 5 is a sectional view taken on the line 5—5 of Fig. 1, showing the internal operating members and their relative position to each other.

Fig. 6 is an enlarged detail of the driving wheel taken from the line 6—6 of Fig. 1, showing the internal gear driving mechanism, and means for removing the rotatable rake or knife sections from the cleaner frame, for interchanging.

Fig. 8 is a sectional view taken on the line 8—8 of the Fig. 1 showing the relative positions of the rotary rake and the operating fans, together with their propelling mechanism.

Fig. 9 is a detail of the rotary knife section which may be substituted for the rotary rake section.

Fig. 10 is an end view of the rotary knife section shown in the Fig. 9, showing the position of its cutting blades and means for attaching the same thereto.

Fig. 11 is a detail of the shear to be used with the knife rotary section.

Fig. 12 is an end view of the shear shown in Fig. 11, showing its structure and means for attaching the same.

Fig. 13 is a detail of the fixed rake block used in combination with the rotary rake section.

Fig. 14 is an end view of the rake block shown in Fig. 11, showing the structure and means for attaching the same.

Figure 1:
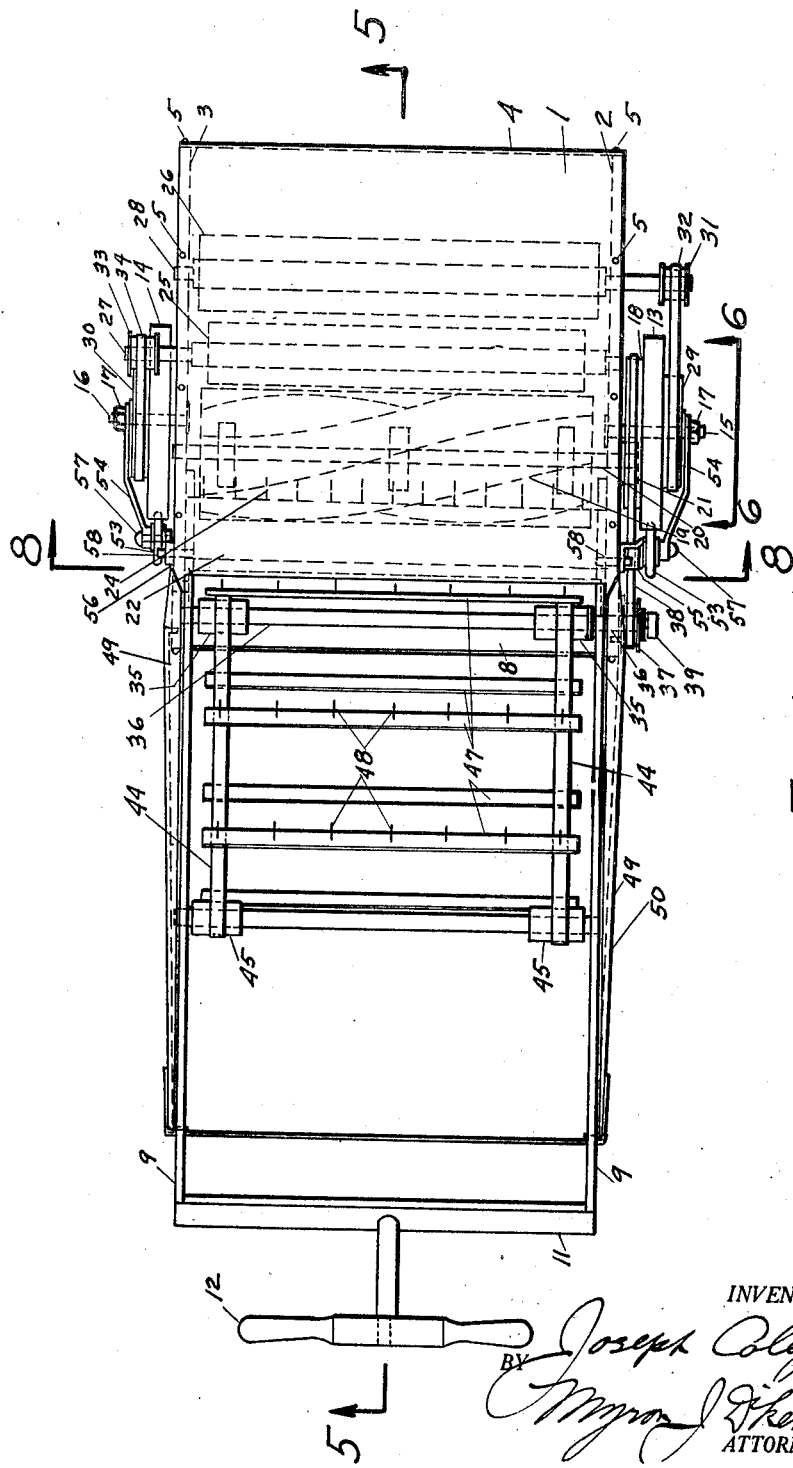
Fig. 1 is a plan view of my cleaner device showing the general arrangement of the working parts, and means of operating the various sections.
Figure 7:
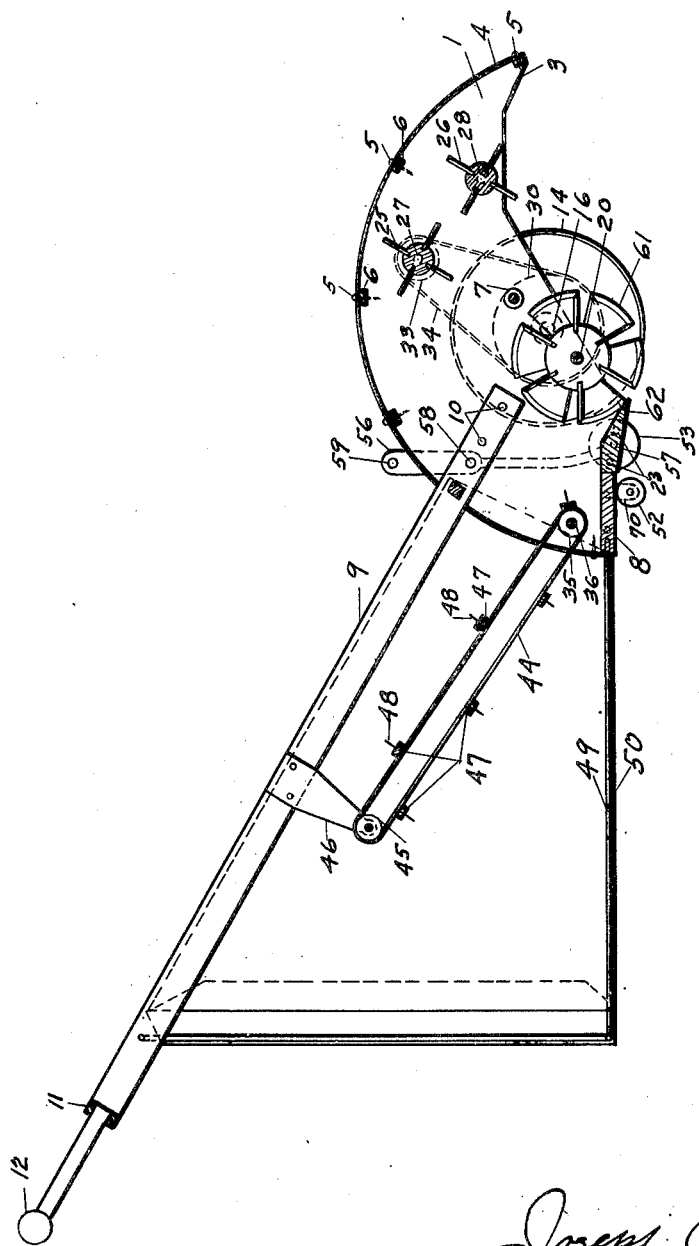
Fig. 7 is also a sectional view taken on the lines 5—5 of the Fig. 1, showing the device converted into a mowing machine, by interchanging of the rotary rake for the rotary knife.

I will now describe more fully the detailed construction of my device, referring to the drawings and the marks thereon.

In general my device comprises a frame structure supported by two side propelling wheels, and designed with a propelling handle projecting from the back side thereof. Within the frame is mounted a rotatable rake member, positioned across the frame and near the lower side thereof for engaging the grass as the propelling wheels rest on the ground, the rotatable rake being caused to rotate by geared means attached to the propelling wheel. Internal rotating fans are mounted within the frame and are also propelled by belt means engaging the propelling wheel members, all operating in a manner to rake and force the leaves and grass backward through the cleaner frame, into a receptacle attached to the rear of the frame. A conveyor belt is mounted within the receptacle, extending therein from directly behind the rotary rake, operated by belt means connecting with the propelling wheel, and facilitates moving the leaves toward the back of the receptacle. When desired, the rotary rake section may be removed from the cleaner frame and the rotary knives inserted in its place, thus converting the machine into a lawn mower and cleaner combined.

The cleaner frame —1— comprises two semi-circular ends —2— and —3—, separated and positioned vertically, one on each end of the frame. Small strut members —6— are morticed along the curved edges of the end members, extending between and fixedly attached thereto, forming a light but rigid frame. The top of the frame is covered with a curved sheet —4—, preferably of thin metal, which is attached thereto by the screws —5—. The ends —2— and —3— are solid, preferably made of thin wood, or a metal sheet, and form a closed covered frame, open at the bottom and at the back edge only. A strut rod —7— is placed across the frame —1—, near the bottom edge thereof, firmly holding the ends —2— and —3— in a fixed rigid position. Across the back edge of the frame —1—, on the under side thereof, is a table —8—, formed of a thin, flat, rigid member which extends across the entire width of the frame opening, and is attached to the ends —2— and —3— by means of screws. Projecting from the back side of the frame —1—, and fixedly attached thereto, are two side frame bars —9—, the same being attached to the ends —2— and —3— by the screws —10—, said side bars —9— are connected at their outer ends by the end bar —11—, forming a rigid rectangular frame. An operating handle —12—, is fixedly attached to the center of the end bar —11—, providing means for propelling the device manually. Near the center of the frame section —1—, at each end are mounted the two drive wheels —13— and —14—, said wheels being supported thereon by the plug axles —15— and —16— fixedly attached to the ends —2— and —3—, and are in true alignment with each other. The wheels —13— and —14— being held thereon by the nuts —17— engaging the outer ends of the axles, but which allow said wheels to rotate freely thereon. On the inside of the wheel —13— is mounted an internal gear —18—, positioned concentric with the wheel circumference and center, and fixedly attached to said wheel wall. Mounted across the inside of the frame —1—, parallel to the axis of the drive wheels —13—, and —14—, is a cylindrical rake —19—, supported by the shaft —20—, rotatably mounted in the ends —2— and —3— of the frame —1—. A spur gear —21— is fixedly attached to the outer end of the shaft —20—, positioned outside of the end —2—, said cylindrical rake —19— and shaft —20— being so positioned therein as engage the gear —21— with the internal gear —18— as mounted on the inner face of the drive wheel —13—, providing means for rotating the cylindrical rake as the machine is pushed over the ground by the handle —12—. Directly behind the cylindrical rake —19— is fixedly attached the rake head —22—, extending across the width of the opening of frame —1—, the same being attached to the frame by the screws —23—, said rake head extending back to and adjacent with the table —8—, and positioned at an angle downward, to near the bottom of the rake cylinder teeth, but not engaging therewith. A series of fine rake fingers —24— project from the bottom edge of the rake head —22— for engaging and lifting dry leaves and grass to be engaged by the revolving rake —19—, the same forcing the leaves back over the rake head —22— and table —8—. Within the forward upper section of the frame section —1—, and rotatably mounted therein are two fan wheels —25— and —26—, positioned parallel with the axis of the drive wheels and cylindrical rake —19—, said fan wheels being supported therein by the shafts —27— and —28— which are rotatably mounted in the end members —2— and —3— of the frame —1—, and free to turn therein. On the outsides of the drive wheels —13— and —14— are fixedly attached drive pulleys —29— and 30—, both positioned thereon and attached thereto concentric with the axis thereof, said pulleys rotating with the wheels. To the ouside end of the shaft —28— is attached an operating pulley —31—, positioned directly in line with the drive pulley —29— of the wheel —13—, and is connected thereto by the belt —32—. Also to the outside end of the shaft —27—, on the opposite end of frame —1—, is attached an operating pulley —33—, positioned directly in line with the drive pulley —30— of the wheel —14—, and connected therewith by the belt —34—. Both fan wheels —25— and —26— are caused to rotate as the machine is pushed along the ground on the supporting drive wheels —13— and —14—, causing an air draft through the frame casing, over the revolving rake cylinder —19—, and blowing the leaves and grass back on the table —8— as the device is operated. The closed cover frame —1— is raised slightly at the front edge thereof to allow the same to pass over the leaves and engage the revolving rake. At the back side of the frame —1— is mounted a conveyor roller —35—, rotatably mounted therein by the shaft —36— which passes through the ends —2— and —3— and free to turn therein. Said shaft —36— extends outside of the end —2— and carries a pulley —37— loosely mounted thereon, and positioned directly in line with the internal gear —18— attached to the inner face of the drive wheel —13—. An operating belt —38— engaging the outside of the gear rim connects with the pulley —37—, providing means for rotating the same. A clutch handle —39— is slidably mounted within the hollow end of the shaft —36—, and held therein by the coil spring —41—, carries an extended pin —40— for engaging the holes —43— in the outer face of the pulley —37—, connecting the pulley to the shaft by the shaft collar —42—. The pin —40— passing through a hole in the collar can be withdrawn therefrom and turned to one side, and allows the pulley —37— to rotate free on the shaft. A conveyor belt —44— is mounted on the roller —35— and supported at its opposite end by the idler roll —45—, rotatably mounted on the frame members —9— by the bearings —46—. The conveyor belt is provided with narrow cross bars —47— which carry projecting therefrom pointed engaging pins —48—, so positioned and designed as to engage the leaves and grass as may be forced on the table —8— by the rake —19— and fan wheels. The cover sheet —4— of the frame —1— is provided with an opening at the back end thereof to allow the passage of the conveyor and leaves therethrough. Attached to the rear side of the frame —1—, and to the side frame bars —9— is a wire basket frame —49—, the same being covered with a canvas casing —50— tightly fitted thereon and attached thereto by the button clips —51—, forming a receptacle for the leaves and grass from the conveyor —44—. The frame —1— is also provided with a supporting roller —52— extending across the entire width of the frame, and pivotally mounted thereon by the side bearings —70—. At both ends of the frame —1— are mounted secondary carrying wheels —53—, connected thereto by the swinging arms —54— pivoted to the plug axles —15— and —16—. Adjusting arms —55— and —56— are attached to the carrying wheels —53— by the pivots —57—, and are supported by the wall pins —58— projecting from the ends —2— and —3—, which engage therein through the holes —59—. By placing the adjusting arms with the upper holes —59— engaging the pins —58—, the carrying wheels —53— are lowered to a position lower than the drive wheels —13— and —14—, and the machine lifted completely from the ground, for removing the same from one place to another. Should it be desired to remove the cylindrical rake —19— from the frame —1—, the drive wheel —13— is first removed from its supporting axle —15—, thus disengaging the internal gear —18— from the drive gear —21— of the rake shaft, allowing said shaft —20— to be removed therefrom through its slotted bearing —60— as shown in Fig. 6, and is formed in the end —2— of the casing —1—. The rotatable knife section —61— may then be inserted therein in place of the rake cylinder —19—, and the machine assembled. By removing the screws —23—, the rake head —22— may also be removed and the shear table —62— inserted in its place, said shear table being adjusted to the rotatable knife section —61— to form a sliding contact with the cutting edges of the knives, and thus converting the device into a grass cutting machine. Its operation is exactly the same as heretofore described.

Having fully described my combination lawn cleaning device, what I claim as my invention and desire to secure by Letters Patent is:

1. A lawn cleaning device comprising a partially inclosed semi-circular frame casing, said frame casing being opened along the bottom side thereof and mounted on two drive wheels, a cylindrical rake section rotatably mounted within said frame casing, positioned parallel with the drive wheel axis and near the bottom side of said frame, said cylindrical rake being actuated by direct connection with one of the drive wheels, an extension frame attached to the back side of the frame casing and provided with a propelling handle thereon, a receptacle chamber attached to said extension frame and frame casing, and opening into said frame casing directly back of the cylindrical fan, a movable conveyor attached to said frame casing at the receptacle opening and extending back into the receptacle chamber, said conveyor being actuated by direct connection with the drive wheels, a circular fan section rotatably mounted within the frame casing on the front side of the cylindrical rake and near the casing opening, said fan being actuated by direct connection with one of the drive wheels for forcing the refuse from the rake back to the conveyor and into the receptacle chamber.

2. A lawn cleaning device adapted for gathering and removing leaves and refuse from a lawn, comprising a partially inclosed frame casing mounted on two drive wheels, said casing being opened on the bottom side thereof and provided with an extension frame projecting from one side thereof with a propelling handle thereon for pushing the frame over the ground, a cylindrical rake section rotatably mounted within the said frame casing positioned parallel to the axis of the drive wheels and near the bottom side of the frame so as to engage the grass as the drive wheels roll on the ground, said rake being actuated by direct gear connection to the drive wheels, a receptacle chamber attached to the extension frame and to the inclosed frame casing and opening therein directly behind the cylindrical rake section, a belt conveyor mounted within the receptacle chamber and extending through the receptacle opening of the frame casing, said conveyor being actuated by belt means connected directly with one of the drive wheels, a fixed rake head mounted within the frame casing directly back of the cylindrical rake but not engaging therewith, two cylindrical fan sections rotatably mounted in the front portion of the frame casing and caused to rotate by direct belt connection from the drive wheels.

3. A lawn cleaning device adapted for gathering and removing leaves and refuse from a lawn, comprising a partially inclosed semi-circular frame casing mounted on two drive wheels, said frame casing being open at the bottom side thereof, an extension frame attached to the back side of said frame casing and provided with a propelling handle for pushing the cleaner over the ground, a receptacle chamber attached to the extension frame and the frame casing, and opening into the frame casing through a small passage therein, an interchangeable cylindrical rake section rotatably mounted within the said frame casing directly in front of the receptacle opening, said cylindrical section being positioned therein parallel to the axis of the drive wheels and to engage the lawn grass as the drive wheels rest on the ground, said interchangeable cylindrical section being actuated by direct gear connection with the drive wheels, an interchangeable rake head fixedly attached to the frame inclosure walls directly behind the interchangeable cylindrical section, a belt conveyor propelled by belt connection from the drive wheels, mounted within the receptacle chamber and extending through the receptacle opening in the frame casing, and two cylindrical fan sections rotatably mounted within the front section of the frame casing ahead of the interchangeable cylindrical rake section, said fans being actuated by direct belt connection with the drive wheels.

In witness whereof I sign these specifications.

JOSEPH COLEY.